(12) United States Patent
Riveros

(10) Patent No.: US 8,349,187 B2
(45) Date of Patent: Jan. 8, 2013

(54) METHOD TO REMOVE ANTIMONY FROM COPPER ELECTROLYTES

(75) Inventor: Patricio A. Riveros, Ottawa (CA)

(73) Assignee: Her Majesty the Queen in Right of Canada as Represented by the Minister of Natural Resources, Ottawa, Ontario (CA)

( * ) Notice: Subject to any disclaimer, the term of this patent is extended or adjusted under 35 U.S.C. 154(b) by 335 days.

(21) Appl. No.: 12/633,378

(22) Filed: Dec. 8, 2009

(65) Prior Publication Data

US 2010/0230294 A1 Sep. 16, 2010

(30) Foreign Application Priority Data

Feb. 10, 2009 (CA) ..................... 2653392

(51) Int. Cl.
 *B01J 39/00* (2006.01)
(52) U.S. Cl. ......... 210/664; 210/670; 210/677; 210/688
(58) Field of Classification Search .................. 210/664, 210/670, 677, 688
 See application file for complete search history.

(56) References Cited

U.S. PATENT DOCUMENTS

| 3,297,708 | A | * | 1/1967 | Garber et al. ................. 548/190 |
| 4,559,216 | A | | 12/1985 | Nagai et al. ................... 423/531 |
| 5,366,715 | A | * | 11/1994 | Dreisinger et al. ........... 423/531 |
| 5,573,739 | A | | 11/1996 | Baboudjian et al. ............ 423/87 |
| 5,989,430 | A | * | 11/1999 | Motoba et al. ................ 210/634 |
| 6,153,081 | A | * | 11/2000 | Fukui et al. .................... 205/563 |
| 2004/0118249 | A1 | * | 6/2004 | Asano et al. .................... 75/722 |

FOREIGN PATENT DOCUMENTS

| JP | 61-178421 | 8/1986 |
| JP | 1-241541 | 9/1989 |
| JP | 5-214576 | 8/1993 |
| JP | 8-193230 | 7/1996 |
| JP | 8-253825 | 10/1996 |
| JP | 11-199947 | 7/1999 |
| WO | WO 94/26378 | 11/1994 |

OTHER PUBLICATIONS

P.A. Riveros, J.E. Dutrizac and R. Lastra, Differences in the Removal of Antimony (III) and Antimony (V) From Copper Electrolytes Using Ion Exchange, Proceedings of the Sixth International Copper 2007 Conference, 2007, pp. 149-163, vol. IV.
E.A. Roman, J.C. Salas, J.E. Guzman and S. Muto, Antimony Removal by Ion Exchange in a Chilean Tankhouse at the Pilot Plant Scale, Proceedings of Copper 99, 1999, pp. 225-236, vol. III.

* cited by examiner

*Primary Examiner* — Chester Barry
(74) *Attorney, Agent, or Firm* — Winston & Strawn LLP

(57) ABSTRACT

A method and solution for eluting one of antimony(V) and a mixture of antimony(III) and antimony(V) from an ion exchange resin, comprises contacting the resin with an eluting solution comprising thiourea having a concentration of at least 0.002 M and hydrochloric acid having a concentration of at least 3 M. The method can be used for electrolytes in an industrial electrorefining process, by the further steps of contacting the electrolyte with an ion exchange resin to adsorb the antimony from the electrolyte and separating the resin from the electrolyte, before contacting the resin with the eluting solution comprising thiourea and hydrochloric acid. The method and solution address the difficulties of removing antimony(V), and allow for increased reuse of the resins.

14 Claims, 1 Drawing Sheet

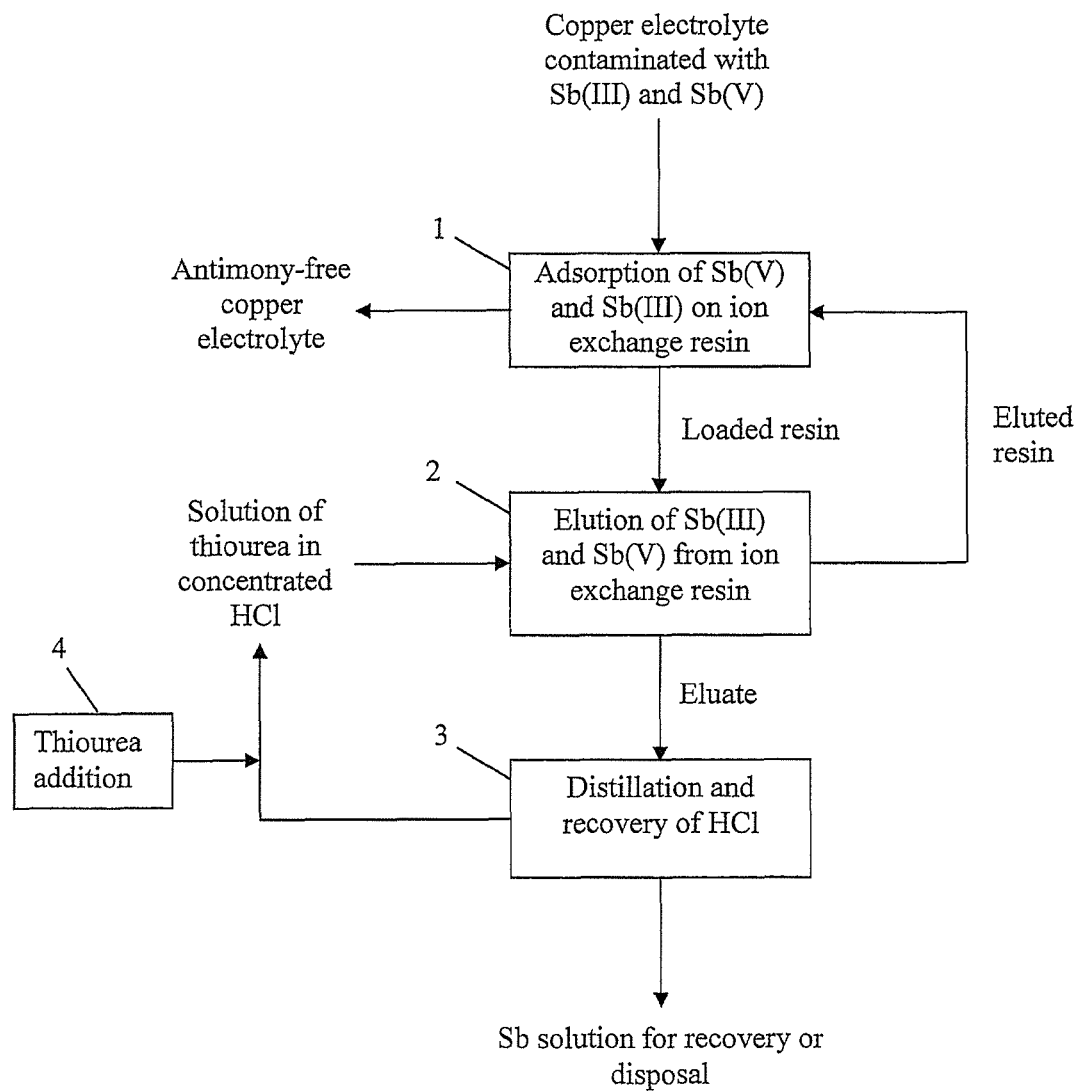

METHOD TO REMOVE ANTIMONY FROM COPPER ELECTROLYTES

CROSS-REFERENCE TO RELATED APPLICATIONS

This application claims the benefit of Canadian Patent Application Serial No. 2,653,392 filed Feb. 10, 2009.

FIELD OF THE INVENTION

The present invention relates to a method for removing antimony impurities from copper electrolytes. More particularly, the present invention relates to a method for improving the overall desorption of antimony from ion-exchange resins, generally aminophosphonic resins, which are used to remove antimony from copper electrolytes in the form of antimony(III) and antimony(V) ions. This improvement is achieved by accelerating the desorption rate of antimony(V) so that both antimony species can be completely desorbed within an adequate period of time.

BACKGROUND OF THE INVENTION

Electrorefining is a well-known industrial process for producing metals with a very high purity level. For example, in a copper electrorefining process, unrefined impure copper anodes are hung vertically between pure metal cathode starter sheets in an electrolytic cell filled with an aqueous solution of copper sulphate and sulphuric acid, which is known as the electrolyte. An electrical current is passed through the electrolytic cell and copper gradually dissolves from the anode into the electrolyte and then plates onto the cathode. Provided that they meet specific purity and morphology standards, the copper cathodes are shipped and sold to various manufacturers of copper products.

For economic reasons, the electrolyte is recycled and reused as many times as possible. However, one of the known problems is that the electrolyte becomes gradually contaminated with impurities contained in the anode. Antimony is one such impurity which is particularly harmful to the electrolytic process. In copper electrorefining processes, antimony tends to co-deposit on the copper cathodes, thus reducing their purity and commercial value. Therefore, industrial copper electrorefineries must keep the antimony concentrations below certain limits to prevent antimony from contaminating the copper cathodes.

U.S. Pat. Nos. 4,559,216 and 5,366,715 describe methods for removing antimony from copper electrolytes in an electrorefining process. These methods involve contacting the electrolyte with an ion exchange resin having aminophosphonic groups (—NH—$CH_2$—$PO_3H_2$), such as Duolite™ C-467 manufactured by Rohm and Haas (USA), and UR-3300 and MX-2 manufactured by Unitika (Japan), to remove the antimony present in the electrolyte.

After the antimony ions have been adsorbed on the resin and the resin has been separated from the electrolyte and washed, it becomes necessary to desorb the antimony from the resin (a procedure known in industry as "elution") so that the resin may be reused and the antimony may be recovered or disposed of.

Current industrial practice is to desorb or elute the antimony ions from the resin by using a concentrated hydrochloric acid (HCl) solution, which can be subsequently recovered by distillation. After the ion exchange resin has been eluted, the resin can be reused to adsorb more antimony ions from the copper electrolyte and the recovered hydrochloric acid can be reused to elute further antimony ions from the resin.

The main drawback of this ion exchange method is that the resin becomes inactive or "poisoned" after a number of repetitions of the adsorption and elution steps. As shown in the article "A Study of the Ion Exchange Removal of Antimony (III) and Antimony(V) from Copper Electrodes" by P. A. Riveros, J. E. Dutrizac and R. Lastra, published in the Canadian Metallurgical Quarterly, Volume 47, Number 3, pages 307-315, 2008, the poisoning of the ion exchange resin is caused by the gradual accumulation of antimony(V) in the resin phase. This accumulation occurs because the elution rate of antimony(V) with hydrochloric acid is much slower than the elution rate of antimony(III). As a result, the eluted resin that is recycled to adsorption usually contains small amounts of antimony(V). After each adsorption/elution cycle, the concentration of antimony(V) in the resin phase increases gradually, causing a decrease in the resin loading capacity and, eventually, the formation of antimony-bearing compounds in the pores of the resin and on the resin surface.

Extending the elution time until all the antimony(V) has been desorbed is impractical and costly because it would tie up a significant amount of the resin in the elution step, leading to an increase in resin inventory, the plant size and the associated capital and operating costs. In addition, the volume of hydrochloric acid solution required for the elution would increase proportionally, as well as the size and energy consumption of the hydrochloric acid distillation equipment.

Some electrorefineries attempt to reactivate the poisoned ion exchange resin by periodically washing the resin with sodium hydroxide (NaOH). However, this method only causes the resin beads to swell, thereby breaking off any superficial layers of antimony-containing precipitates. Some resin beads break because of the swelling, thereby exposing fresh surfaces on which antimony can be adsorbed. However, sodium hydroxide is not an effective eluting agent for either antimony(III) or antimony(V) and, therefore, this treatment only causes a short-lived reactivation. A further drawback to this proposed approach is that subjecting the ion exchange resin to repeated contacts with acid and alkaline media significantly weakens the resin's structure and shortens its useful life.

What is therefore needed is a cost effective method for increasing the elution rate of antimony(V) from aminophosphonic resins to fully restore their capacity within a suitable period of time so that the accumulation of antimony(V) in the resin is eliminated and therefore the need for periodic replacement of the resin can be significantly reduced or avoided entirely.

SUMMARY OF THE INVENTION

It has now been found experimentally that the reagent thiourea, $(NH_2)_2CS$, also known as thiocarbamide, has the capacity of accelerating the desorption rate of antimony(V) with hydrochloric acid, resulting in a substantially complete elution of antimony(V) from aminophosphonic resins in a relatively short time. It has also been found that the use of thiourea does not interfere with the known effective elution of antimony(III) with hydrochloric acid.

The present invention relates to a method for eluting either antimony(V) or a mixture of antimony(III) and antimony(V) from an ion exchange resin, having aminophosphonic groups or other groups with high affinity for antimony. The method comprises contacting an antimony-laden ion exchange resin with a solution comprising hydrochloric acid, having a concentration of at least 3 M, and thiourea, to elute either the antimony(V) or the mixture of antimony(III) and antimony (V) from the ion exchange resin. The thiourea can have a concentration of as low as 0.002 M, depending on the hydrochloric acid concentration. It would be expected that other halogen acids, such as hydrobromic acid (HBr) and hydriodic acid (HI), would provide similar results, but this would not presently be economically feasible on an industrial scale, having regard to the current prohibitively high cost of such acids; similarly, the highly hazardous nature of hydrofluoric acid, in addition to its cost, would preclude its use.

Preferably, the hydrochloric acid has a concentration between 3 M and 12 M, and more preferably between 4 M and 6 M. Preferably, the thiourea has a concentration of between 0.002 M and 0.1 M, most preferably between 0.01 M and 0.03 M.

Preferably, the resin is an aminophosphonic resin.

Preferably, the method further comprises distilling the eluting solution to recover the halogen acid.

An important advantage of the method of the present invention is that it enables the complete elution of antimony(V) from the ion exchange resin in an acceptable period of time, and this regenerates the resin capacity; eliminates the need for periodic sodium hydroxide (NaOH) washing of the ion exchange resin; increases the useful life of the resin; and improves efficiencies and economies of existing electrorefining processes.

A still further advantage of the present invention is that the reagent thiourea is compatible with the electrorefining process in general, and indeed is often present in trace amounts in the electrolyte to improve the surface of the cathode.

In a first broad aspect, the present invention seeks to provide a method for eluting one of antimony(V) and a mixture of antimony(III) and antimony(V) from an ion exchange resin, the method comprising the step of:

contacting the resin with an eluting solution comprising thiourea having a concentration of at least 0.002 M and hydrochloric acid having a concentration of at least 3M.

In a second broad aspect, the present invention seeks to provide a solution for eluting one of antimony(V) and a mixture of antimony(III) and antimony(V) from an ion exchange resin, the solution comprising thiourea having a concentration of at least 0.002 M and hydrochloric acid having a concentration of at least 3 M.

In a third broad aspect, the present invention seeks to provide a method for removing one of antimony(V) and a mixture of antimony(III) and antimony(V) from an electrolyte in an industrial electrorefining process, the method comprising the steps of:

(a) contacting the electrolyte with an ion exchange resin to adsorb the antimony from the electrolyte;
(b) separating the resin from the electrolyte; and
(c) contacting the resin with an eluting solution comprising thiourea having a concentration of at least 0.002 M and hydrochloric acid having a concentration of at least 3 M, to elute both antimony(III) and antimony(V) from the resin.

The improved results of the ion exchange method of the present invention will be readily apparent to a person of ordinary skill in the art based on a comparison of the following two examples in which Example 1 shows the performance of a known ion exchange method and Example 2 shows the improvements achieved by the ion exchange method of the present invention.

Example 1

In the first experiment, ten millilitres of aminophosphonic resin Duolite™ C-467 were transferred to a small glass column. The resin was loaded with antimony(V) by pumping 150 millilitres of a solution containing 200 mg/L of antimony (V) in 1.68 M sulphuric acid through the column. From the solution chemical analyses, it was estimated that about 30 mg of antimony(V) had been adsorbed on the resin. The resin was washed with water and then eluted at 50° C. with 6 M hydrochloric acid at a flowrate of 5 millilitres per hour. The column eluate was collected in various fractions and analyzed for antimony. From these results and the composition of the feed solution, the percentage of antimony(V) eluted was calculated. The following table shows the results, as well as the time elapsed since the beginning of the experiment.

| Fraction volume (mL) | Concentration of antimony(V) in each fraction (mg/L) | Percentage of antimony(V) eluted (%) | Time elapsed since the beginning of the experiment (hours) |
|---|---|---|---|
| 32 | 21 | 2.3 | 6.0 |
| 30 | 56 | 7.9 | 12.0 |
| 30 | 49 | 12.8 | 18.0 |
| 30 | 43 | 17.1 | 24.0 |
| 28 | 40 | 20.8 | 29.0 |
| 81 | 32 | 29.4 | 46.0 |
| 38 | 26 | 32.6 | 53.6 |
| 85 | 21 | 38.6 | 70.8 |
| 34 | 19 | 40.7 | 77.5 |
| 81 | 16 | 45.0 | 94.0 |

This experiment demonstrates that the desorption rate of antimony(V) from an aminophosphonic resin with hydrochloric acid is extremely slow. After 94 hours (3.9 days) of elution only 45% of the antimony(V) had been eluted from the resin. It may be concluded from these results that the elution rate of antimony(V) with hydrochloric acid alone is extremely slow and the complete elution of antimony(V) is unlikely to be achieved within the time cycles used in industrial applications.

Example 2

In the second experiment, ten millilitres of fresh aminophosphonic resin Duolite™ C-467 were prepared exactly as described in Example 1. This time, the resin was eluted with a 6 M hydrochloric acid solution containing 1 g/L (0.013 M) of thiourea, using exactly the same experimental conditions described in Example 1. The column eluate was collected in various fractions and analyzed for antimony. From these results and the composition of the feed solution, the percentage of antimony(V) eluted was calculated. The following table shows the results, as well as the time elapsed since the beginning of the experiment.

| Fraction volume (mL) | Concentration of antimony(V) in each fraction (mg/L) | Percentage of antimony(V) eluted (%) | Time elapsed since the beginning of the experiment (hours) |
|---|---|---|---|
| 16 | 5 | 0.2 | 2.8 |
| 17 | 86 | 4.6 | 5.9 |
| 20 | 513 | 36.0 | 9.9 |
| 20 | 762 | 82.6 | 13.9 |
| 21 | 156 | 92.7 | 17.9 |
| 22 | 54 | 96.2 | 21.9 |
| 21 | 24 | 97.7 | 25.9 |
| 22 | 12 | 98.6 | 29.9 |

These results demonstrate that the presence of thiourea significantly increases the rate of the antimony(V) elution. In this case, already 98.6% of the antimony(V) had been eluted in 29.9 hours (1.2 days) after passing only 159 mL (15.9 bed volumes) of eluting solution through the column. This result is a significant improvement over the elution with hydrochloric acid alone, as presented in Example 1.

BRIEF DESCRIPTION OF THE DRAWINGS

The invention will now be described with reference to the drawing, in which:

FIG. 1 is a flowchart of the method of the present invention.

DETAILED DESCRIPTION OF THE INVENTION

Referring to FIG. 1, a flowchart of an ion exchange method according to the present invention is shown. The method of the present invention begins at step 1 where a copper electrolyte contaminated with both antimony(III) and antimony(V) from a well-known electrorefining process is contacted with an ion exchange resin, preferably an aminophosphonic resin, to adsorb the antimony(III) and antimony(V) from the electrolyte. Once antimony(III) and antimony(V) have been adsorbed on the ion exchange resin, the antimony-free copper electrolyte can be recycled to electrorefining or subjected to further purification steps to remove other impurities. The method of the present invention proceeds to step 2 where the loaded resin is contacted with an eluting solution comprising thiourea having a concentration of at least 0.002 M and hydrochloric acid having a concentration of at least 3 M to elute both antimony(III) and antimony(V) ions from the resin. After the resin has been eluted, it may be reused to adsorb antimony(III) and antimony(V) ions from the same or another electrolyte. The eluate solution, containing hydrochloric acid, thiourea and antimony, proceeds to step 3, where hydrochloric acid is volatilized by applying heat and recovered for reuse. The residual antimony solution can be processed for recovery or safe disposal. Thiourea is added at step 4 to the recovered hydrochloric acid, to produce a solution for return to the elution step 2.

It should be noted that, because the presence of thiourea in the eluting solution has no negative effect on the elution of antimony(III), both antimony(III) and antimony(V) can be eluted simultaneously in step 2 of the present invention. However, in cases where the concentration of antimony(V) is low relative to that of antimony(III), it may not be necessary to use thiourea at every elution cycle. Rather, the resin may be contacted with hydrochloric acid alone or a chelating agent to elute the antimony(III) only. In such cases, the elution of antimony(V) with thiourea and hydrochloric acid can be carried out periodically whenever the "poisoning" of the resin becomes noticeable.

It should still further be noted by that while this invention is directed primarily to copper electrolytes, it is conceivably applicable to any ion exchange or adsorption process, where the resin or adsorbent becomes "poisoned" or inactive because of the accumulation of antimony(V). Examples of such resins or adsorbents are activated carbon and polymers or substrates having crown-ether groups, such as those manufactured by IBC Advanced Technologies Inc. (USA) under the trade name Superlig. Examples of applications include the processing of industrial effluents, electroplating solutions, electrowinning solutions of copper, nickel and zinc, and electrorefining solutions of nickel and zinc.

What is claimed is:

1. A method for eluting one of antimony(V) and a mixture of antimony(III) and antimony(V) from an ion exchange resin, the method comprising the step of:
    contacting the resin with an eluting solution comprising thiourea having a concentration of at least 0.002 M and hydrochloric acid having a concentration of at least 3 M.

2. A method according to claim 1, further comprising, prior to the washing step, selectively washing the resin with hydrochloric acid to elute antimony(III) from the resin.

3. A method according to claim 1, wherein the hydrochloric acid has a concentration of between 4 M and 12 M.

4. A method according to claim 3, wherein the hydrochloric acid has a concentration of between 4 M and 6 M.

5. A method according to claim 1, wherein the thiourea has a concentration of between 0.002 M and 0.1 M.

6. A method according to claim 1, wherein the resin is an aminophosphonic resin.

7. A method for removing one of antimony(V) and a mixture of antimony(III) and antimony(V) from an electrolyte in an industrial electrorefining process, the method comprising the steps of:
    (a) contacting the electrolyte with an ion exchange resin to adsorb the antimony from the electrolyte;
    (b) separating the resin from the electrolyte; and
    (c) contacting the resin with an eluting solution comprising thiourea having a concentration of at least 0.002 M and hydrochloric acid having a concentration of at least 3 M to elute at least the antimony(V) from the resin.

8. A method according to claim 7, further comprising after step (b), the step of:
    (b.1) selectively contacting the resin with hydrochloric acid to elute antimony(III) from the resin.

9. A method according to claim 7, wherein the hydrochloric acid has a concentration of between 4 M and 12 M.

10. A method according to claim 9, wherein the hydrochloric acid has a concentration of between 4 M and 6 M.

11. A method according to claim 7, wherein the thiourea has a concentration of between 0.002 M and 0.1 M.

12. A method according to claim 7, wherein the resin is an aminophosphonic resin.

13. A method according to claim 7, further comprising the step of:
    (d) distilling the washing solution to recover the hydrochloric acid and antimony sulphide derived from the resin.

14. A method according to claim 7, wherein the electrolyte is a member selected from the group consisting of a copper electrolyte, a nickel electrolyte and a zinc electrolyte.

* * * * *